(12) United States Patent
Mitchell et al.

(10) Patent No.: US 7,509,642 B1
(45) Date of Patent: Mar. 24, 2009

(54) METHOD AND SYSTEM FOR AUTOMATICALLY PROVIDING NETWORK-TRANSACTION-STATUS UPDATES

(75) Inventors: Kay Ellen Mitchell, Kansas City, MO (US); Daniel Christopher Wieschhaus, Shawnee, KS (US); Peter Tarlos, Olathe, KS (US); Stephen Dwayne Thomasee, Gladstone, MO (US); Kenneth James Aubuchon, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1036 days.

(21) Appl. No.: 10/664,826

(22) Filed: Sep. 17, 2003

(51) Int. Cl.
G06F 9/46 (2006.01)
G06F 12/00 (2006.01)
G06F 15/16 (2006.01)
G06F 11/00 (2006.01)

(52) U.S. Cl. ..................... 718/101; 707/200; 709/201; 714/100

(58) Field of Classification Search ................. 718/101; 707/3; 455/1, 445; 709/201; 714/100
See application file for complete search history.

(56) References Cited

U.S. PATENT DOCUMENTS 5,907,805 A * 5/1999 Chotai ..................... 455/414.1
6,219,711 B1 * 4/2001 Chari ......................... 709/232
6,363,411 B1 * 3/2002 Dugan et al. ................ 709/202
6,671,716 B1 * 12/2003 Diedrichsen et al. ........ 709/203
6,901,474 B2 * 5/2005 Lym et al. ................... 710/305
2002/0040304 A1 * 4/2002 Shenoy et al. .................. 705/1
2002/0136375 A1 * 9/2002 Bouffard et al. ....... 379/114.01
2003/0056171 A1 * 3/2003 Yone et al. ................... 715/505
2003/0236777 A1 * 12/2003 Conway ......................... 707/3
2004/0078340 A1 * 4/2004 Evans .......................... 705/64

FOREIGN PATENT DOCUMENTS

| JP | 2000348111 A | * | 12/2000 |
| JP | 2002109168 A | * | 4/2002 |
| JP | 2003337880 A | * | 11/2003 |
| WO | WO 9204679 A | * | 3/1992 |

* cited by examiner

Primary Examiner—Meng-Ai An
Assistant Examiner—Kenneth Tang

(57) ABSTRACT

A system and method for automatically providing real-time transaction-progression status updates in a telecommunications-networking environment are provided. The transaction requires several substeps to complete. As these substeps are completed, statuses corresponding to the completions are sent to one or more user interface. An embodiment of the method includes receiving a transaction that involves performing multiple subprocesses, generating a set of status indicators as the various subprocesses complete, and dynamically broadcasting the indicators to multiple devices (or a single device).

13 Claims, 4 Drawing Sheets

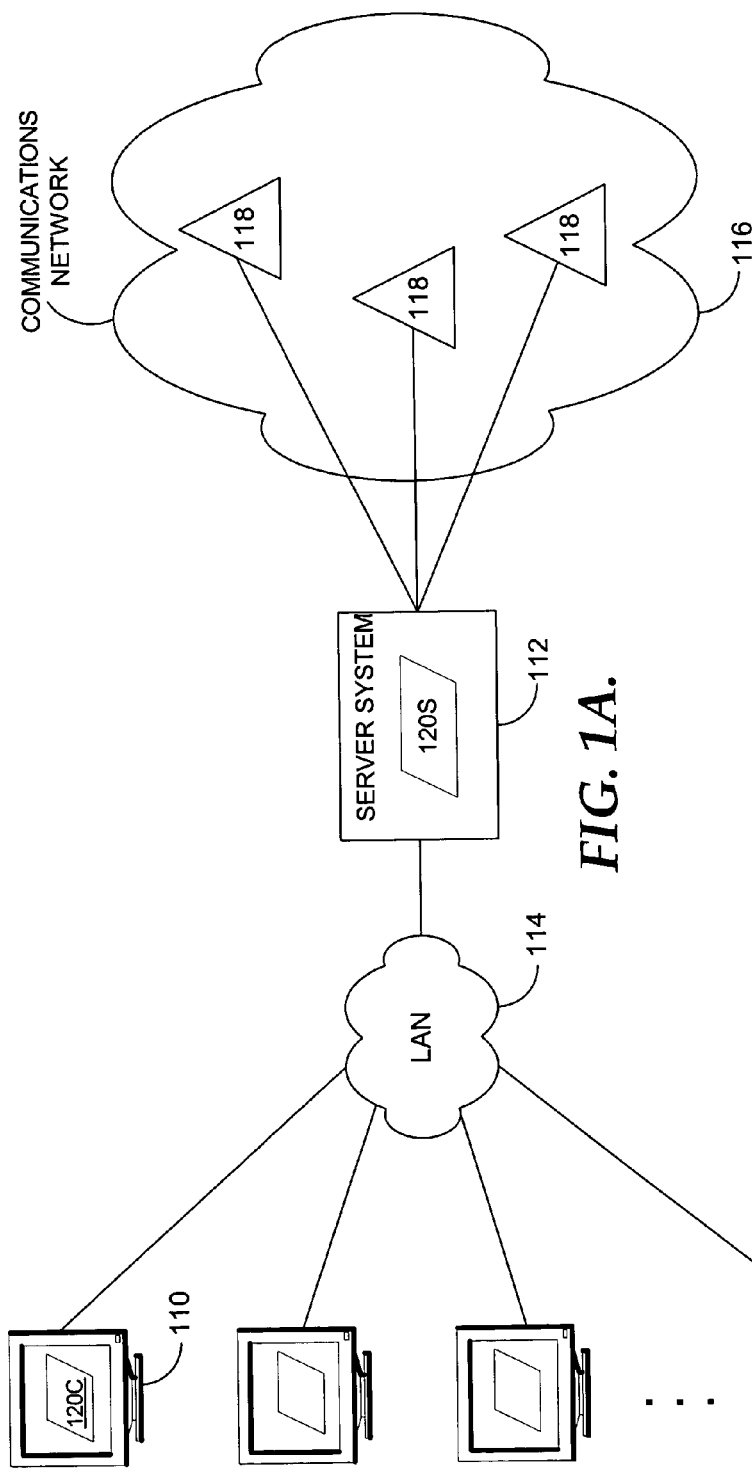
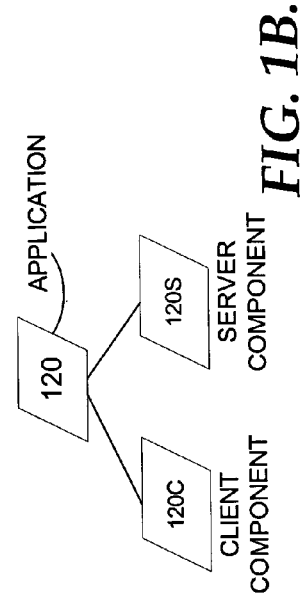
*FIG. 1A.*
*FIG. 1B.*

METHOD AND SYSTEM FOR AUTOMATICALLY PROVIDING NETWORK-TRANSACTION-STATUS UPDATES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the fields of telecommunications networking and computer programming. More particularly, it relates to processing network transactions and monitoring the progression of the same.

BACKGROUND OF THE INVENTION

A telecommunications network is composed of a wide array of devices that employ a litany of technologies. A common task involves processing data transactions. Although a transaction may take many forms, typically a transaction updates a database. Databases are ubiquitous throughout a network and may exist in many devices: switches, routers, signal transferors, etc. In some instances, a database is nothing more than a collection of records. But often, a database is quite complex and executing a transaction is commensurately complex. A transaction may be necessary to update routing. Destination addresses may need to be changed. Switch designations may need to be modified. The types and ramifications of the different types of database modifications (transactions) are nearly limitless.

Executing a transaction may require several substeps or processes to be performed. To analogize, mailing a letter to a destination requires several substeps: collection from a sending location, delivery to sorting facility, emergence from a series of sorting events, distribution to a delivery facility, etc. Continuing this parallel, the prior art does not provide for a way to automatically inform a user that these subprocesses have been completed.

In the telecommunications environment, a transaction may need to be received, transmitted, scheduled, validated, etc., before finally completing. A problem that plagues communications carriers is related to monitoring the progression of transactions. Historically, a manual, one-transaction-at-a-time query method is used to monitor transaction processing. Such a method is slow and prone to error. To successfully query, a user had to know what information to key in, what information to monitor, what interfaces to navigate and type in search criteria, and how to interpret the data that was returned.

This prior art method was accomplished by successive query requests manually submitted. One of the easiest ways this was accomplished was for a user to repetitively press an update button, whereby a single transaction's status would be provided. Successive button presses would produce successive updates. But even this method required manual intervention, prevented a user from accomplishing other tasks until the transaction executed, and retrieved updates regarding only a single transaction.

The prior art relied upon a "pull" type of technology, where a user would manually "pull" or request status updates. Because users would typically be locked out of their workstation as the transaction completed, they would repeatedly submit status-update requests to determine whether the transaction was processing as anticipated and to know when they would be able to move on to other tasks. These many requests would consume valuable bandwidth and slow related systems.

This method of manually requesting updates required a user to have in-depth knowledge of a desired transaction's attributes in order to submit an update request. Moreover, the user who submits a request is typically the only user who can monitor a request. The querying process itself slows the notification that the user needs regarding the status of the desired transaction. Transactions are limited to being monitored one at a time in any prior-art schemes.

The present state of the art could be improved by providing a transaction-processing system that dynamically provides transaction-processing status updates automatically in real time. The art could be further improved by providing a method to asynchronously facilitate the execution of transactions in a networking environment. Finally, there is a need to be able to provide transaction status updates to multiple, rather than a single, receiving component.

SUMMARY OF THE INVENTION

The present invention is a system that automatically provides unsolicited, real-time status updates of transactions completing in a network environment. The invention has several practical applications in the technical arts, such as providing transaction-status updates without user interaction, thereby freeing resources and eliminating a need for manual update requests. The present invention also enables asynchronous transaction execution, which enables a user to pursue other tasks while a transaction is completing its various substeps. The present invention also provides the ability to broadcast status updates to multiple workstations, screens, and/or persons, including to those other than the transaction initiator. Many more applications and uses will become evident after reading this disclosure.

Replacing a laborious, time-intensive manual process that relied on a pull type of technology where a user manually submitted successive requests to receive updates regarding a single transaction, the present invention automatically pushes transaction updates to one or more users. Transaction updates may take the form of status indicators that correspond to various stages of a processing transaction as it progresses toward completion. The present invention does not require a user to have a high degree of knowledge of a certain transaction's attributes to receive updates. Rather, those updates can be configured to be automatically sent to the user.

Reception of updates is not limited to the user who submitted the request. Nodes can be designated to receive updates. The present invention reduces the time a transaction takes to complete by eliminating the bandwidth allocated to receiving the manual transaction-update requests. Multiple transactions can be monitored simultaneously by the present invention.

In a first aspect, a method is provided for automatically presenting the progress of a transaction. The method includes receiving a transaction to execute. Typically, the transaction will require completing many substeps. Without user interaction, the system communicates to one or more display devices statuses related to the substeps. Statuses such as "begun," "in progress," "executed," "submitted," "validated," "accepted,"

etc., can be provided. Updates sent from various individual users can be sent to a single node to be monitored rather than merely returned to the submitting user's node.

In another aspect of the invention, a computer program product is provided that, when executed, provides for automatic, real-time, transaction-progression status updates. Transactions are received and configurable status indicators are generated that correspond to the transaction's progress. Feedback is dynamically communicated to a broadcasting device, which allows status updates to be sent to multiple receiving components (or aggregated to a single receiving component) without user interaction.

In still another aspect, a system is provided for monitoring the progression of transactions submitted to a network. The system includes a request-receiving component that receives an incoming transaction; a status-monitoring component that monitors the progression of the transaction and provides feedback related to the status of the transaction's progression toward completion; and a status-transmission component that receives the feedback and communicates the feedback to a group of receiving devices.

In still another aspect of the invention, a system is provided for asynchronously monitoring network transactions in real time. The system includes a user-interface component for submitting one or more transaction requests, a transaction-processing system for executing transactions, and another user-interface component(s) (which could be the same as the first user-interface component) for receiving the updates and simultaneously presenting them, even if the updates relate to distinct transactions.

In a final aspect, the present invention includes a method for performing transaction updates asynchronously. The method includes receiving a request to execute one or more transactions. This request typically comes from a user but may come from another electronic device. Even though processing control is withheld from the user during the short time that the transaction is communicated to a receiving component, processing control is returned to the user before the transaction is completely executed, which normally will include completing many substeps.

BRIEF DESCRIPTION OF THE SEVERAL
VIEWS OF THE DRAWINGS

The present invention is described in detail below with reference to the attached drawing figures, wherein:

FIG. 1A is a block diagram depicting an illustrative operating environment suitable for practicing the present invention;

FIG. 1B is a component diagram illustrating an embodiment of the present invention having a client component and a server component;

DETAILED DESCRIPTION OF THE INVENTION

Figure 2A:
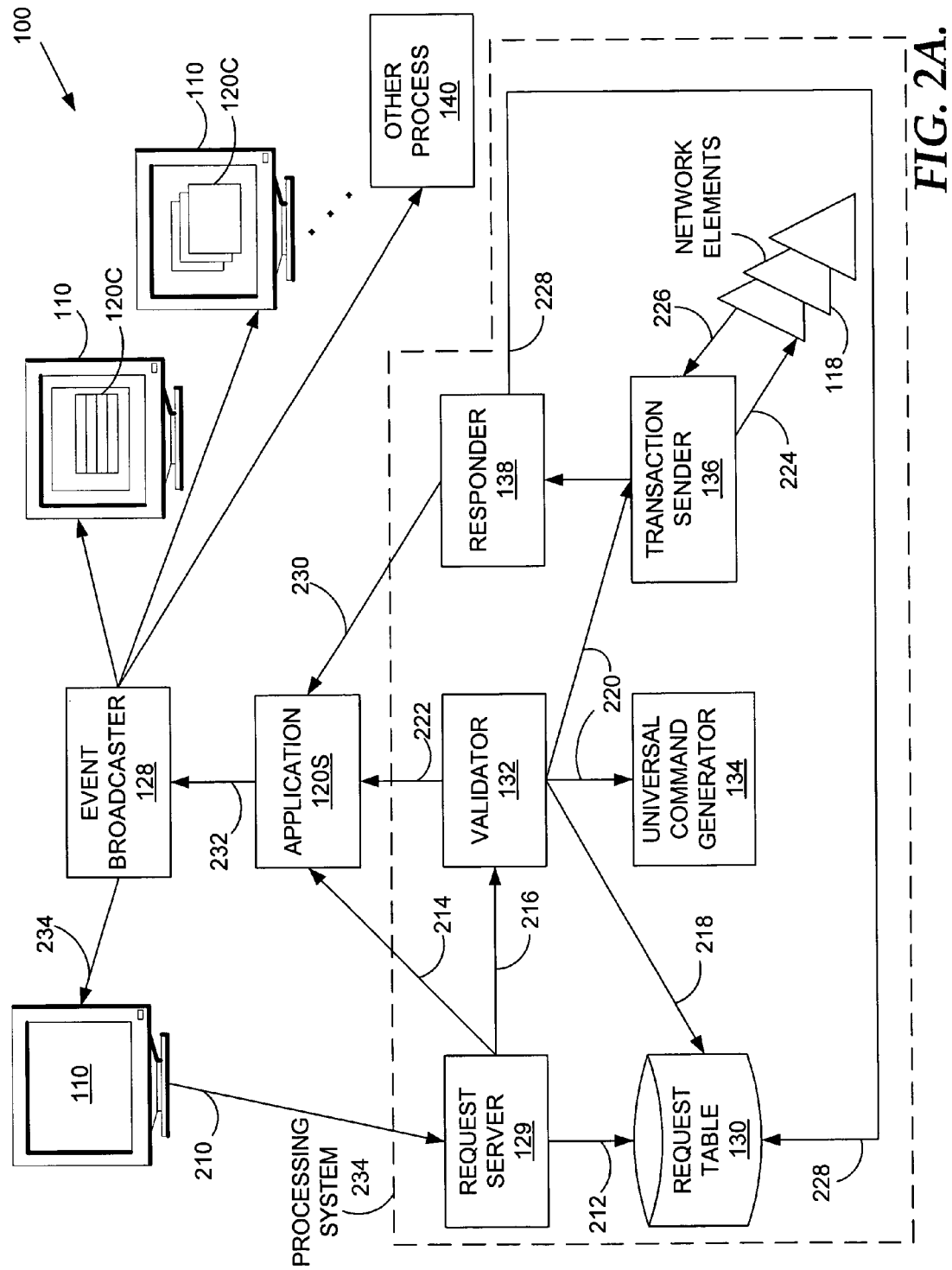
FIG. 2A is a combined block diagram and flow diagram illustrating an embodiment of the present invention in greater detail.
Figure 2B:
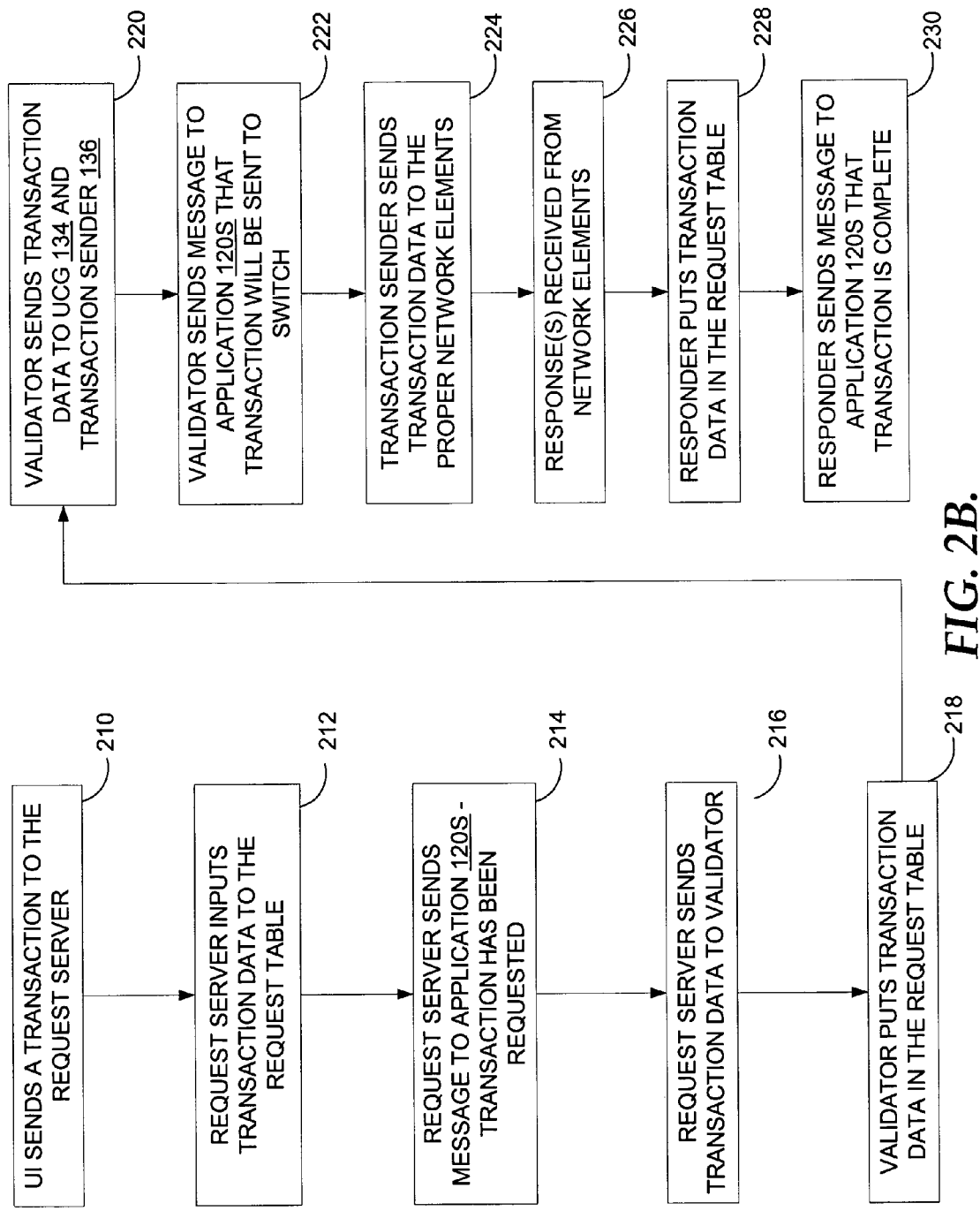
FIG. 2B is a flow diagram in accordance with an embodiment of the present invention.

The present invention automatically provides status updates related to processing a transaction in a communications network environment. Various technical terms are used throughout this description of the present invention. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are the means of communicating with the same. By way of example, and not limitation, computer-readable media include data-storage media and communications media.

Data-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, Digital Versatile Discs (DVD), holographic media or other optical storage devices, magnetic cassettes, magnetic tape, magnetic disk storage, and other magnetic storage devices. These memory components can store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1A depicts an illustrative operating environment suitable for practicing the present invention. FIG. 1A includes a group of client computers 110 coupled to a server system 112 by a LAN 114. Server system 112 is coupled to a communications network 116, which includes many network elements 118. The invention includes an application 120, which is composed of a client component 120C and server component 120S (see FIG. 1B) in a preferred embodiment. In this embodiment, server component 120S runs on server system 112 and client component 120C runs on client machine 110, which can be a Java-based program that uses a publish/subscribe event-distribution model to provide the status updates to designated user interfaces. Similar to the physical-world, magazine-distribution model, events can be published and those designated to receive them do so.

The present invention enables transaction requests to be initiated at client machine 110 and monitored as various substeps of the transaction are completed throughout the communications network 116. A common transaction is a database update. A communications network may have several hundred or thousands of databases that describe customer features, call-routing instructions, and countless other data sets. Transactions can take on other forms as well. For instance, a transaction may implement a Local Exchange Routing Guide (LERG) update. The LERG is a document issued by Telcordia Technologies, Inc., of Morristown, N.J. (formerly Bellcore) that is used to identify NPA-NXX routing and homing information as well as network-element and equipment designation. The LERG contains a listing of local-routing data such as destination codes, switching entities, rate centers and locality information by LATA. The LERG is an essential tool for network planning but is in a constant state of flux. LERG updates are well known in the art (albeit monitoring their implementation is resource intensive absent the present invention) and are commonly required on a daily basis.

As the transactions complete in communications network 116, status updates are automatically returned to one or more client components 120C. A more detailed explanation of an exemplary process is provided with reference to FIG. 2A.

Turning now to FIG. 2A, a more detailed process for monitoring in real time the progression of transactions is provided. FIG. 2A includes client machine 110, application 120S, event broadcaster 128, request server 129, request table 130, validator 132, universal-command generator 134, transaction sender 136, and responder 138. A component for indicating other processes 140 is also provided.

The present invention enables a transaction to be received that requires various subprocesses to be performed. Status indicators associated with each of the individual subprocesses (or certain designated processes) are generated and dynamically communicated to a broadcasting device. The broadcasting device sends the status indicators to designated receiving components.

At a step 210, request server 129 receives a transaction request from client machine 110. In a preferred embodiment, client component 120C is used to create a transaction request. This transaction request requires several subprocesses to complete, which will be described in greater detail below. The present invention enables a user to view the progression of the transaction towards completion. At a step 212, request server 129 adds data corresponding to the transaction to request table 130. Request table 130 stores the data relating to the transaction request and its progression.

At a step 214, request server 129 notifies application 120S that the transaction has been requested. This notification can be passed to event broadcaster 128, which automatically communicates the update in real time to designated instances of client application 120C. Request server 129 sends the transaction to validator 132 at a step 216. Validator 132 optionally applies a set of business-validation rules to the transaction to insure that it is in a proper format to be implemented.

Validator 132 can perform such operations as syntax checking, format checking, transaction-integrity checking, and the like. Validator 132 then places transaction-related data in request table 130 at a step 218. At a step 220, validator 132 sends the transaction data to both the universal command generator 134 and transaction sender 136. Transaction sender 136 sends the transaction to the respective network elements that are necessary to process the transaction.

Having completed another exemplary subprocess of the transaction, validator 132 sends a message to application 120S that a transaction is ready to be sent to the various network elements. Application 120S then communicates this event-to-event broadcaster 128, which can dynamically communicate this message to the various client machines 110. At a step 224, transaction sender 136 sends the transaction to the various network elements that are necessary to process the transaction. At a step 226, transaction sender 136 receives the response or responses from network elements 118. Responder 138 then updates requests table 130 at a step 228. Responder 138 also sends a message to application 120S that the transaction is complete, that it is successfully processed by network elements 118 at a step 230. Again application 120S communicates this update to event broadcaster 128, which immediately communicates this status update to various client devices 110. Instead of sending status updates to end-user devices, event broadcaster 128 can also provide input to other processes 140.

Figure 3:
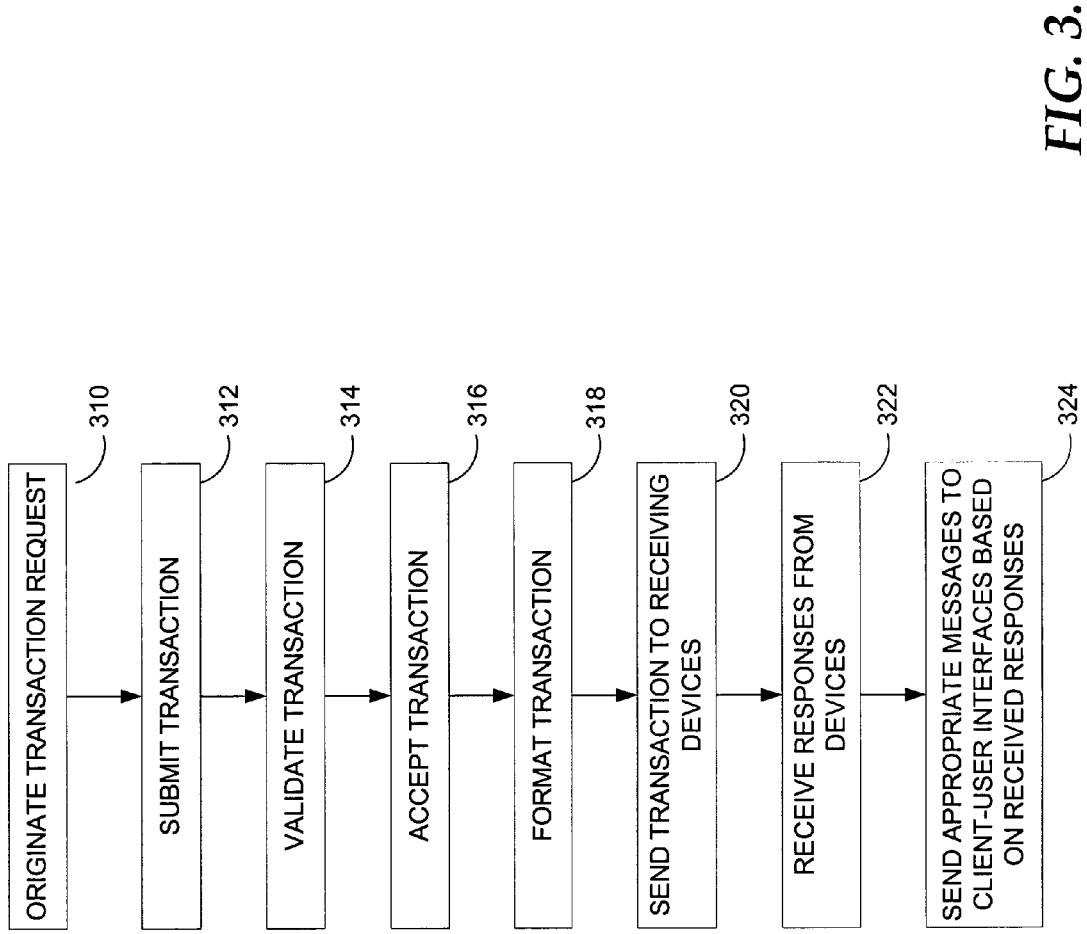
FIG. 3 is a flow diagram in accordance with a second embodiment of the present invention.

Turning now to FIG. 3, an alternative embodiment for practicing the present invention is provided. Not all steps in FIG. 3 are required steps and some steps may be performed in a different order. At a step 310 a transaction request is originated. This transaction request can be originated by client device 110 using client component 120C. As previously mentioned, client component 120C includes a user interface for transmitting transaction requests and receiving transaction updates. In alternative embodiments, a second user interface can be used to receive status updates. In some embodiments status updates are sent to multiple client devices 110, and in other embodiments all updates can be sent to a single client device 110.

In this later embodiment, a single person can monitor all updates and respond accordingly. Such an arrangement allows increased efficiencies by reducing the amount of resources necessary to monitor and address transaction-update progression. The transaction is submitted at a step 312 and optionally validated at a step 314. The transaction can be accepted by a variety of devices including a processing system such as system 234 (see FIG. 2A).

Different network elements such as communication switches, routers, etc., may require the transaction to be formatted. Accordingly, the transaction can be formatted as required at a step 318. This transaction is then sent to various network elements 118 at a step 320. Responses are received from the various devices indicating whether the transaction was successful or not at a step 322. Appropriate messages are sent to the different client-user interfaces 120C based on the receiver responses at a step 324.

A status update can be sent to various client devices based on any of the aforementioned steps (210-230 or 310-324). In this manner, the present invention receives a request to execute potentially multiple transactions. Instead of withholding process control from a user until the entire transaction is processed, processing may be withheld only until such time that a receiving device (such as request server 129 or processing system 234) receives the transaction request. Whereas in prior-art systems, processing was delayed until the entire transaction had completed, the present invention allows user control to be returned more quickly, as soon as a receiving device receives the transaction request. Control is returned to a user incident to receiving a transaction request but prior to actually executing the entire transaction request at the various network elements 118. The updates are sent automatically without a user having to manually request status updates.

As can be seen, the present invention and its equivalents are well adapted to provide a new and useful method for, among other things, providing status updates associated with the progression of a transaction. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need to be carried out in the specific order described.

The invention claimed is:

1. In a communications-networking environment, a method for automatically presenting the progress of a transaction, comprising:
   receiving a transaction that requires completing one or more substeps wherein a substep is a process to be performed in an execution of the transaction, wherein receiving the transaction includes, without user interaction, suspending user control until said transaction is received but prior to when said transaction is completed, and wherein the transaction includes two or more of the following:
      modifying call-routing instructions associated with a telecommunications network;
      implementing a database update; and
      implementing a LERG (Local Exchange Routing Guide) update; and
   without user interaction, communicating to one or more display devices one or more indications respectively related to said one or more substeps as said one or more substeps are performed wherein communicating to the one or more display devices comprises communicating the one or more indications to a broadcasting device and sending the one or more indications from the broadcasting device to the one or more display devices.

2. The method of claim 1, wherein communicating said one or more indications include communicating the indications to a device other than the device from which the transaction request was submitted.

3. The method of claim 1, wherein communicating said one or more indications include communicating indications corresponding to disparate transactions to one or more display devices wherein disparate transactions are separate distinct transactions.

4. The method of claim 1, wherein said indications respectively related to said two or more substeps correspond to one or more of the following events:
   when a transaction is submitted;
   when a transaction is received;
   when a transaction is validated;
   when a transaction is accepted;
   when a transaction is reformatted;
   when a transaction is sent to one or more network devices; and/or
   when one or more messages from said one or more network devices are received.

5. The method of claim 4, wherein said indications include a description of said respective event.

6. One or more computer-readable storage media having computer-useable instructions embodied thereon for automatically providing real-time transaction-progression status updates, said method comprising:
   receiving a transaction, wherein the execution of the transaction involves performing one or more subprocesses, wherein receiving the transaction includes, without user interaction, suspending user control until said transaction is received but prior to when said transaction is completed, and wherein receiving the transaction includes receiving two or more of the following:
      a database-update request;
      a LERG (Local Exchange Routing Guide) update; and
      a network-device-configuration change;
   generating a plurality of status indicators as said one or more subprocesses progress; and
   dynamically communicating one or more of said plurality of status indicators to a broadcasting device, whereby said plurality of status indicators can be sent to one or more receiving components.

7. The media of claim 6, wherein generating a plurality of status indicators include generating an indication of one or more of the following events:
   when a transaction is submitted;
   when a transaction is received;
   when a transaction is validated;
   when a transaction is accepted;
   when a transaction is reformatted;
   when a transaction is sent to one or more network devices; and/or
   when one or more messages from said one or more network devices are received.

8. The method of claim 7, wherein said plurality of status indicators include a description of said respective event.

9. The method of claim 6, wherein dynamically communicating one or more of said plurality of status indicators are accomplished without user intervention.

10. The method of claim 6, wherein dynamically communicating one or more of said plurality of status indicators include sending indicator(s) associated with unique transactions simultaneously wherein the unique transactions are separate distinct transactions.

11. In a communications networking environment, a system having a processor coupled to a memory for monitoring transaction progression in real time, the system comprising:
   a request-receiving component that receives an incoming transaction wherein said request receiving component retains processing control while receiving said incoming transaction but releases processing control, without user interaction, prior to final execution of said transaction and wherein said incoming-transaction includes two or more of the following:
      a call-routing modification associated with a telecommunications network;
      a database update;
      a LERG (Local Exchange Routing Guide) update; and
      a network-device-configuration change;
   a status-monitoring component—coupled to said request-receiving component—that monitors the progression of said transaction and provides feedback related to the status of the transaction's progression toward completion; and
   a status-transmission component that receives said feedback and communicates said feedback to one or more receiving devices.

12. The system of claim 11, wherein the status-monitoring component identifies a plurality of events that are accomplished as said transaction progresses toward final execution.

13. The system of claim 12, wherein the plurality of events include one or more of:

submitting a transaction to process;
receiving a transaction;
validating a transaction;
accepting a transaction;
sending a transaction to one or more network devices; and
receiving one or more responses from said network devices.

\* \* \* \* \*